(12) United States Patent
Hilt et al.

(10) Patent No.: US 7,660,875 B2
(45) Date of Patent: *Feb. 9, 2010

(54) BIDIRECTIONAL REMOTE COMMUNICATION VIA BROWSER PLUG-IN

(75) Inventors: Patrick Hilt, San Diego, CA (US); Marc Abrahams, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1928 days.

This patent is subject to a terminal disclaimer.

(21) Appl. No.: 09/945,583

(22) Filed: Aug. 31, 2001

(65) Prior Publication Data

US 2003/0046374 A1 Mar. 6, 2003

(51) Int. Cl.
*G06F 15/16* (2006.01)
(52) U.S. Cl. .................. 709/219; 709/217; 709/218; 717/171; 717/172
(58) Field of Classification Search .............. 709/201, 709/202, 204, 205, 206, 217, 218, 219; 710/303; 705/59; 717/171, 172
See application file for complete search history.

(56) References Cited

U.S. PATENT DOCUMENTS

| | | | | |
|---|---|---|---|---|
| 6,374,177 B1* | 4/2002 | Lee et al. | ..................... | 701/200 |
| 7,016,964 B1* | 3/2006 | Still et al. | ................... | 709/229 |
| 7,028,127 B2* | 4/2006 | Kang et al. | ................. | 710/303 |
| 7,072,974 B2* | 7/2006 | Hepworth et al. | ........... | 709/236 |
| 2003/0088517 A1* | 5/2003 | Medoff | ....................... | 705/59 |

* cited by examiner

*Primary Examiner*—Patrice Winder
*Assistant Examiner*—Adnan Mirza
(74) *Attorney, Agent, or Firm*—John L. Rogitz

(57) ABSTRACT

A browser plug-in, system for bidirectional communication and method for bidirectional communication between a download device, a first computing device and a second computing device is provided. The system includes a download device communicatively connected to a first computing device, a second computing device communicatively connected to the first computing device and a computer program stored on the first computing device. A first data set is transferred from the first computing device to second computing device via the Internet and the second set of data is bidirectionally communicated from the second computing device to the first computing device via Internet and does not trigger a fire wall.

8 Claims, 3 Drawing Sheets

BIDIRECTIONAL REMOTE COMMUNICATION VIA BROWSER PLUG-IN

This application incorporates herein by reference patent application Ser. No. 09/944,655, filed concurrently herewith, by Hilt, et al, entitled CLIENT-SERVER BIDIRECTIONAL SYNCHRONIZATION VIA BROWSER PLUG IN FOR AN XM RADIO SYSTEM.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention relates generally to electronic communication between a client application and a remote device in a network environment having security restrictions and, more particularly to allowing bi-directional device communication during firewall operation when a dedicated communication port is utilized.

BACKGROUND OF THE INVENTION

Over the years, the Internet and the World Wide Web (WWW) have grown and their utilization has increased from a simple method of communication into a medium for storage, interactive accessing of information, and enablement of remote device control. The Internet and the WWW have captured the public's imagination as the so called "Information Super Highway". Accessing information through the web has been used by the metaphorical term "surfing the web".

However, the Internet is not a single network, nor does it have any single owner or controller. Rather, the Internet is a network of networks, both public and private, connected to each other. The resulting network utilizes security measures, such as fire walls, to prevent the spread of computer viruses, as well as the unauthorized access to account files and data. Given the proliferation of Internet viruses and web hackers, the utilization of security restrictions, such as fire walls, and other security measures in public and private networks remains in place and in the foreseeable future will necessarily continue to grow.

The WWW facilitates users interactive access to information, storage and remote control of devices by letting users or clients jump from one server or network to another, simply by selection of a word, picture, or program. In fact, when exploring the web today, a user navigates the web through the utilization of a "web browser". There are many number of browsers presently in existence. Common examples of browsers include, Netscape's "Navigator", Microsoft's "Explorer", Mosiac's browser, and IBM's "Web Explorer". A web browser allows a client access to servers and networks located throughout the world for storage, information, and remote device control. The information is provided to a client by the remote server by sending files or data packets to the requesting clients computer. However, with the use of fire walls and other security measures, the files or data packets sent by a remote server to a client's computer are blocked and not allowed access.

In recent years, there has also been a steady increase in the different multi-functional, portable electronic devices such as personal digital assistance (PDA), Wireless Application Protocols (WPA), enabled mobile telephones, I-mode mobile telephones, multi-functional portable radio and CD (compact disk) players such as Walkman®, mini disk (MD) players, MP3 music players, and e-markers. With each new generation of these type of portable electronic devices, more features and functions are added, such as wireless data exchange with other portable devices, and host devices such as desk top computers and server terminals. Again, utilization of the Internet as the medium of storage, interactive access of information and remote control of the devices has grown.

Computers and all other devices connected by the Internet are connected by the TCP/IP protocol. In the 1980's, the Advanced Research Project Agency (ARPA), of the U.S. Government, funded the University of California at Berkeley, to provide a Unix implementation of the TCP/IP protocol. What was developed was termed the Socket Interface (although it is sometimes referred to as the Berkeley Socket Interface or just Berkeley Sockets). Today, the Socket Interface is the most wisely used method for accessing an internet network via the TCP/IP.

A socket represents a connection point into a TCP/IP network, much like electrical sockets provide a connection point for appliances in a home. When two computers want to converse, each utilizes a socket. One computer is therefore termed a server, it opens a socket and listens for connections. While the other computer is termed a client, since it calls the server socket to initiate the connection. To establish a connection, a server's destination address and port number are all that is required. Each and every computer in the Internet has a unique TCP/IP address. A port represents an individual connections within that unique TCP/IP address. The analogy may be made to corporate mail, with each person within a company sharing the same address, but with correspondence being routed within the company by the persons unique identifier, their name. Each port within a computer shares the same address, but data is routed within each computer by the port number. Therefore, when a socket is created, it must be associated with a specific port. This process is known as "binding to a port".

Sockets have two major modes of operation, connection and connectionless orientation. Connection orientated sockets operate like a telephone, they must establish a connection and then hang up. Information that flows between these two events arrives in the same order as it was sent. However, connectionless orientated sockets operate like the United States mail and delivery is not guaranteed. In fact, with connectionless orientated sockets, multiple pieces of mail may arrive in an order different from which they were sent.

When interacting with file and data servers, data must arrive correctly and in sequence. If some data is lost, then the server usefulness is invalidated. For example, if data were to get lost, then the server would not want the network to retry, because by the time the re-sent data arrived, it would be too old to have any accuracy. Therefore insuring data sequence and correctness requires extra processing and memory usage, and thus requires the utilization of connection orientated sockets.

Connection orientated operation uses the transport control protocol (TCP). A socket in this mode must connect to the destination before sending data. Once connected, the sockets are accessed using a streams interface, i.e., open-read-write-close. Everything sent by one socket is received by the other of the connections in exactly the same order it was sent. Also, everything sent by one socket must be received by that socket.

Connection orientated operation is less efficient than connectionless operation, but data transmission is guaranteed.

Sockets are characterized by definition of protocol and a port ID number. The port ID number is required to complete a transition and allow an individual application to receive a call. Port ID numbers were not originally mandated by any governing body, but were assigned by convention. Currently, port numbers are assigned by the Internet Assigned Numbers Authority (LANA), and some well known port numbers follow: Echo=Port 7; Dayton=Port 13; FTP=Port 21; Telnet=Port 23; SMTP=Port 25; Finger=Port 79; HTTP=Port 80; and TOP3=Port 110. Therefore, data and file transmission over the Internet and through TCP/IP require transmissions over Port 80. Servers do not create connections, instead, servers passively listen for a client connection request and then provide their services.

When utilizing the Internet for storage, interactive access and remote device control, the utilization of applications on a computer connected to a server require the consideration of security exceptions and fire walls. One method of accomplishing storage, interactive access, and remote device control over the Internet and through web browsers is the utilization of an applet. Again, browsers use very stringent security measures where sockets are concerned and an applet can only open a socket back to the host name/server from which it was loaded. If an applet tries any other connection, a security exception is thrown and a file wall is set up, which blocks the transfers of files and data.

However, the use of an applet to provide file/data storage, information access, and remote device control is also limited by the applet's inability to access the client computer's file system and data, and operate in the transfer, exchange or the like. With the rise of the Internet as the medium for file/data storage, information access, and remote device control, it would be desirable to provide true bidirectional communication via a web browser which has access to a client computer file system and data and would not be blocked by the necessary security restrictions and fire walls which are presently in place.

SUMMARY OF THE INVENTION

In view of the foregoing, a browser plug-in is provided for true bidirectional communication, information transfer and relay, and remote device control.

In particular, a browser plug-in, in one embodiment, is included on a client computer, and has a communication relationship with an application resident on the client computer. Also, the browser plug-in allows for bidirectional communication with a remote server via the internet. A method of one embodiment includes supplying the browser plug-in to any client computing device having network capabilities, communicatively connecting any peripheral device to the client computer, uploading data to the client computer and utilizing the browser plug-in to upload the data from the client computer to the server and to download data from the server to the browser via the browser plug-in without triggering a firewall. In a further embodiment, the browser plug-in may be located on the peripheral device itself, were the device to have network capabilities.

These and other features and advantages of the invention will be understood upon the consideration of the following detailed description of the invention and accompanying drawings. The features of the invention believed to be novel are set forth with particularity in the appended claims. The invention itself however, both as to organization and method of operation, together with further objects and advantages thereof, may be best understood by reference to the following description taken in conjunction with the accompanying drawing.

BRIEF DESCRIPTION OF THE DRAWING

The following detailed description, given by way of example, and not intended to limit the present invention solely thereto, will best be understood in conjunction with the accompanying drawings in which:

FIG. 3 is flow diagram of FIG. 2 which shows one embodiment of the communication steps between the client computer and a server via the browser plug-in.

DETAILED DESCRIPTION OF THE INVENTION

Figure 1:
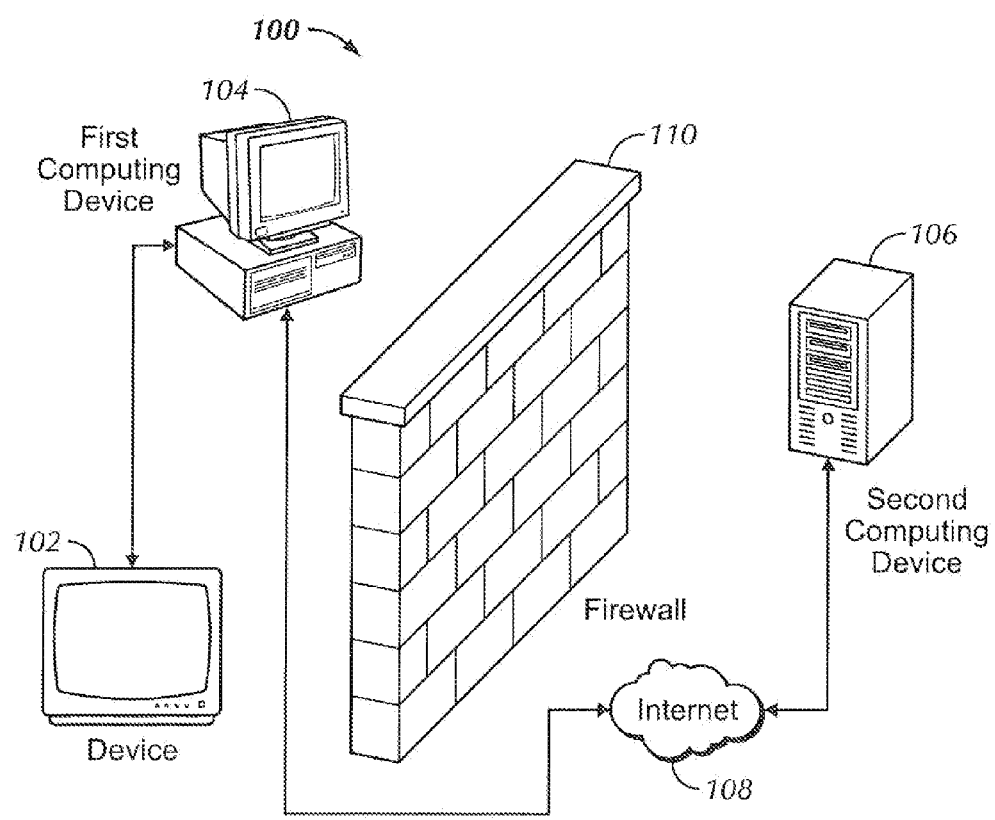
FIG. 1 illustrates one embodiment in which a peripheral device is communicatively connected to a client computer and the client computer is communicatively connected to, and navigates around a fire wall, a server via the Internet.

FIG. 1 illustrates a bidirectional communications system 100. Bidirectional communications system 100 includes a peripheral device 102, which is communicatively connected to a first computing device 104. Bidirectional communications system 100 also includes a second computing device 106, which is communicatively connected to first computing device 104 via the Internet 108. A fire wall 110 is a computer program installed on first computing device 104 which comprises protocols for the interaction of first computing device 104 and second computing device 106. Fire wall 110 is a security measure which prevents computer viruses and hackers from access to the computer files on first computing device 104 and information stored within peripheral device 102.

In one embodiment, peripheral device 102 may be configured to communicatively connect to first computing device 104 by utilizing a USB port. In an alternative embodiment, the interface protocol defined in IEEE 1394 may be used. As another alternative embodiment, RS-232C may be used as an interface for communication. However, the communication is not limited to wire communication, and communication between download device 102 and first computing device 104 may be performed wirelessly using, for example but not limited to, radio frequency carriers such as 802.11B or BLUETOOTH, and/or infrared ray signals using an interface protocol based on IRDA (Infrared Data Association).

Figure 2:
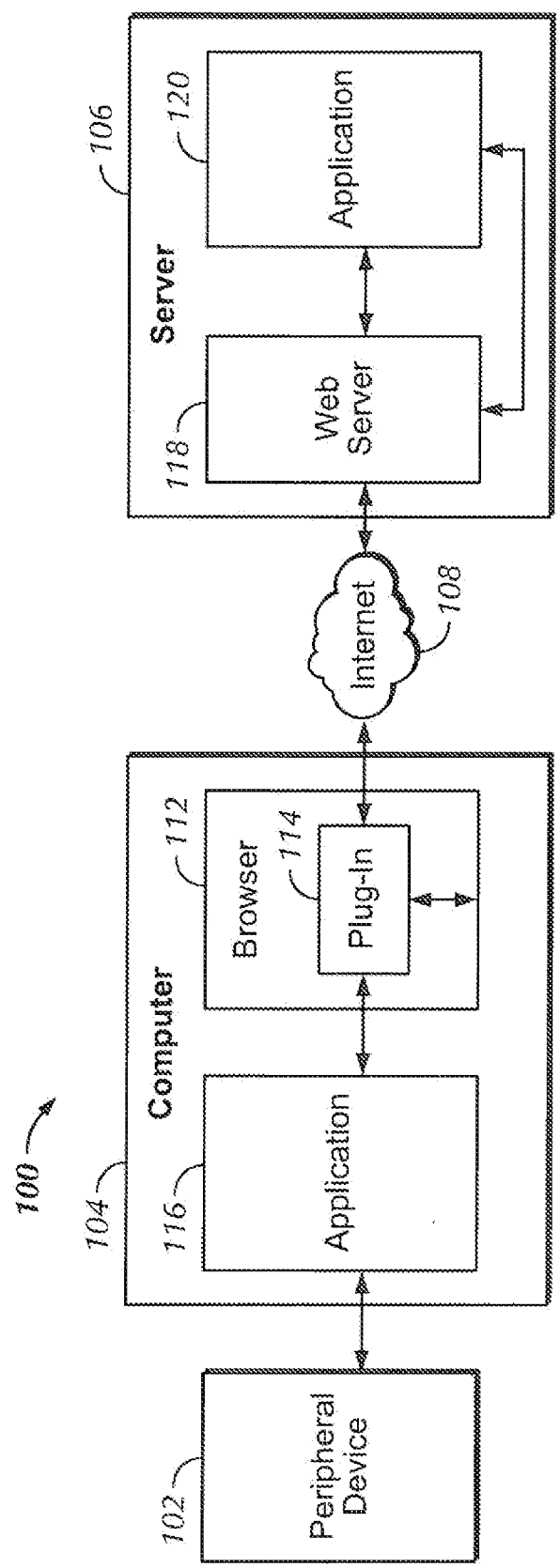
FIG. 2 is a block diagram of FIG. 1, which shows the browser plug-in operating in true bidirectional capacity in the software environment.

FIG. 2 further illustrates the elements of bidirectional communications system 100 by way of a block diagram. In one embodiment, first computing device 104 is a client computer comprising a browser 112. A browser plug-in 114 and a client application program 116 are supplied to client computer 104. Browser plug-in 114 is communicatively connected to client application program 116. Browser plug-in 114 is also communicatively connected to browser 112. In an alternative embodiment, browser plug-in 114, as well browser 112 and client application program 116 could have easily been installed on peripheral device 102. Second computing device 106 also includes a network computer program 118 communicatively connected to a server application program 120. In one embodiment, second computing device 106 is a server which is communicatively connected to computer 104 by way of data communication between network computer program 118 and browser plug-in 114 via internet connection 108.

In operation, peripheral device 102 triggers the launch of client application program 116 which in turn triggers the launch of browser plug-in 114. Browser plug-in 114 launches browser 112 and directs browser 112 to establish electronic communication with server 106 via internet connection 108. Client application program 116 supplies browser plug-in 114 with the uniform resource locator (URL) of server 106. Client application 116 then uploads a first set of data from said peripheral device 102 to server 106 via browser plug-in 114 and internet connection 108. Server 106 then processes the first set of data and arrives at a second set of data. Server 106 then utilizes browser plug-in 114 to direct browser 112 to the second set of data at a particular internet address utilizing URLs supplied to browser 112 by server 106. The utilization of these URLs supplied to browser 112 by server 106, via browser plug-in 114, mimics the control of browser 112 by a user and thus prevents the triggering of firewall 110 (see FIG. 1). In this way, server 106 downloads the second set of data to computer 104 without triggering firewall 110.

Figure 3:
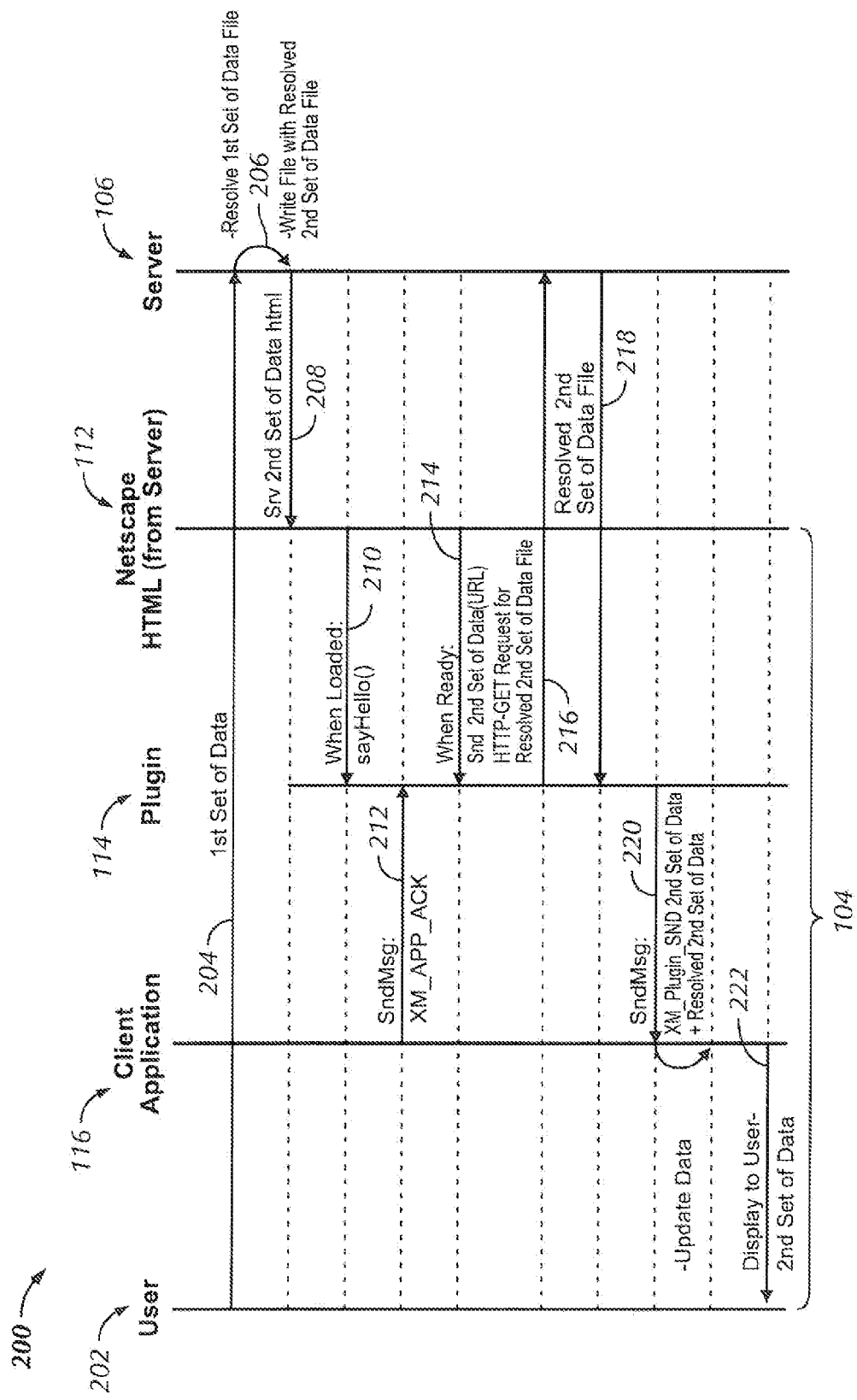

FIG. 3 illustrates one embodiment of the communication steps 200 between computer 104 and server 106 via browser plug-in 114. Computer 104 comprises a user 202, client application 116, browser plug-in 114, and browser 112. The first set of data is uploaded to server 106 via computer 104 by way of uploading step 204. The first set of data is incomplete and/or contains unresolved data. Server 106 resolves the first set of data by providing complete and/or resolved data and writes a file with the resolved second set of data by way of resolution step 206. In one embodiment, browser 112 is a Netscape browser. Server 106 then transmits an acknowledgment and availability of the resolved second set of data by a formatted HTML page sent to browser 112 by transmission step 208. The acknowledgment contains a URL for the resolved second set of data. Browser 112 then communicates to browser plug-in 114 the URL for the resolved second set of data to thereby begin the download process of the resolved second set of data by way of step 210.

The download process includes browser plug-in 114 communicating the server acknowledgment to client application 116. Client application 116 then sends an acknowledgment back to browser plug-in 114 by step 212 indicating availability to thereby permit beginning of the download process of the resolved second set of data. Browser plug-in 114 utilizes the URL previously transmitted from server 106 to browser plug-in 114 via the formatted HTML page to direct browser 112 to the corresponding internet address where the second set of data is filed, stored, and ready to be downloaded by way of request step 216. The second set of data file is then sent to browser plug-in 114 by download step 218. Browser plug-in 114 then transmits a message at step 220 to client application 116 which acknowledges receipt of the second set of data file thus completing the download process. Client application 116 then complements the first set of data with the second set of data, and displays the complete data to user 202 by step 222.

When connected via the Internet 108 to server 106, browser plug-in 114 provides bidirectional communication. Browser plug-in 114 has access to files and data on computer 104. Server 106 is therefore able to overcome firewall 110 on computer 104 by providing to browser plug-in 114 the URL where the second set of data is available. Rather than server 106 pushing the second set of data and triggering firewall 110, computer 104 initiates a download request for the second set of data provided by server 106.

Various other modifications and alterations in the structure and method of operation of this invention will be apparent to those skilled in the art, without departing from the scope and spirit of the invention. Although the invention has been described in connection with specified preferred embodiments, it should be understood that the invention as claimed should not be unduly limited to such specific embodiments. It is intended that the following claims describe the scope of the present invention and that the structures and methods within the scope of these claims and their equivalents be covered thereby.

What is claimed is:

1. A method, comprising:

using a peripheral device to launch a client application program;

using the client application program to launch a browser plug-in;

using the browser plug-in to launch an Internet browser to establish communication with a server; wherein the client application program supplies the browser plug-in with a uniform resource locator (URL) of the server and uploads a first set of data from the peripheral device to the server via the browser, the server then processing the first set of data to arrive at a second set of data, the second set of data being located at an Internet address and the server downloading the Internet address to the browser plug-in, the server further causing the browser plug-in to direct the browser to the Internet address and thus to the second set of data such that control of the browser by a user is mimicked, thereby preventing triggering a firewall.

2. A computer, comprising:

at least one client application;

at least one browser plug-in;

at least one browser; wherein a first set of data associated with the client application is uploaded from the computer by means of the browser to a server, which writes a file with second set of data, the server transmitting an acknowledgment and availability of the second set of data to the browser, the acknowledgment containing at least one URL for the second set of data, the browser communicating to the browser plug-in the URL for the second set of data to thereby begin downloading the second set of data.

3. The computer of claim 2, wherein the first set of data is incomplete and/or contains unresolved data, the server resolving the first set of data by providing the second set of data, the second set of data being complete and/or resolved data.

4. The computer of claim 2, wherein the browser plug-in communicates the server acknowledgment to the client application, the client application in response sending an acknowledgment back to the browser plug-in to thereby permit downloading the resolved second set of data.

5. The computer of claim 4, wherein the browser plug-in uses the URL previously transmitted from the server to direct the browser to an internet address where the second set of data is stored.

6. The computer of claim 5, wherein the second set of data is sent to the browser plug-in, which then transmits the second set of data to the client application.

7. The computer of claim 6, wherein the client application acknowledges receipt of the second set of data.

8. The computer of claim 6, wherein the client application complements the first set of data with the second set of data.

\* \* \* \* \*

UNITED STATES PATENT AND TRADEMARK OFFICE
CERTIFICATE OF CORRECTION

| | | |
|---|---|---|
| PATENT NO. | : 7,660,875 B2 | Page 1 of 1 |
| APPLICATION NO. | : 09/945583 | |
| DATED | : February 9, 2010 | |
| INVENTOR(S) | : Hilt et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2598 days.

Signed and Sealed this

Thirtieth Day of November, 2010

David J. Kappos
*Director of the United States Patent and Trademark Office*